US012603495B2

(12) United States Patent
Yang et al.

(10) Patent No.: US 12,603,495 B2
(45) Date of Patent: Apr. 14, 2026

(54) FAULT CURRENT-LIMITING CONTROL METHOD AND DEVICE FOR PHOTOVOLTAIC GRID-FORMING SYSTEM

(71) Applicant: Zhejiang University, Hangzhou City (CN)

(72) Inventors: Yongheng Yang, Hangzhou City (CN); Hao Ruan, Hangzhou City (CN); Yinxiao Zhu, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 194 days.

(21) Appl. No.: 18/678,167

(22) Filed: May 30, 2024

(65) Prior Publication Data

US 2025/0087993 A1 Mar. 13, 2025

(30) Foreign Application Priority Data

Sep. 11, 2023 (CN) .......................... 202311164800.2

(51) Int. Cl.
| | |
|---|---|
| *H02H 9/00* | (2006.01) |
| *H02H 9/02* | (2006.01) |
| *H02M 7/5395* | (2006.01) |
| *H02S 40/32* | (2014.01) |

(52) U.S. Cl.
CPC ............ *H02H 9/02* (2013.01); *H02M 7/5395* (2013.01); *H02S 40/32* (2014.12)

(58) Field of Classification Search
None
See application file for complete search history.

(56) References Cited

U.S. PATENT DOCUMENTS

| | | | | |
|---|---|---|---|---|
| 8,547,715 B2 * | 10/2013 | Yuan | ........................ | H02J 3/381 |
| | | | | 363/124 |
| 2018/0248359 A1 * | 8/2018 | Zou | .......................... | H02S 40/34 |
| 2023/0155382 A1 * | 5/2023 | Wang | ...................... | H02S 40/32 |
| | | | | 307/82 |
| 2023/0187944 A1 * | 6/2023 | Xu | ............................ | G05F 1/67 |
| | | | | 307/149 |
| 2025/0087993 A1 * | 3/2025 | Yang | ...................... | H02J 3/381 |

* cited by examiner

*Primary Examiner* — Stephen W Jackson
(74) *Attorney, Agent, or Firm* — Myers Wolin, LLC

(57) ABSTRACT

Provided are fault current-limiting control method and device for photovoltaic grid-forming system. The method includes: obtaining voltage amplitude of the common-coupling point and voltage signal and current signal in a stationary synchronous frame system based on voltage signal and current signal of converter at the common-coupling point; determining a fault depth based on the voltage amplitude of the common-coupling point to determine active power reference of the inverter; generating voltage reference value and phase reference value of the inverter based on the voltage signal and the current signal in the stationary synchronous frame system and the active power reference of the inverter, to obtain current reference value through fixed virtual impedance; and obtaining inverter modulating wave based on the current reference value, and obtaining control signal of each switch transistor of the inverter after modulating the inverter modulating wave through SPWM.

9 Claims, 9 Drawing Sheets

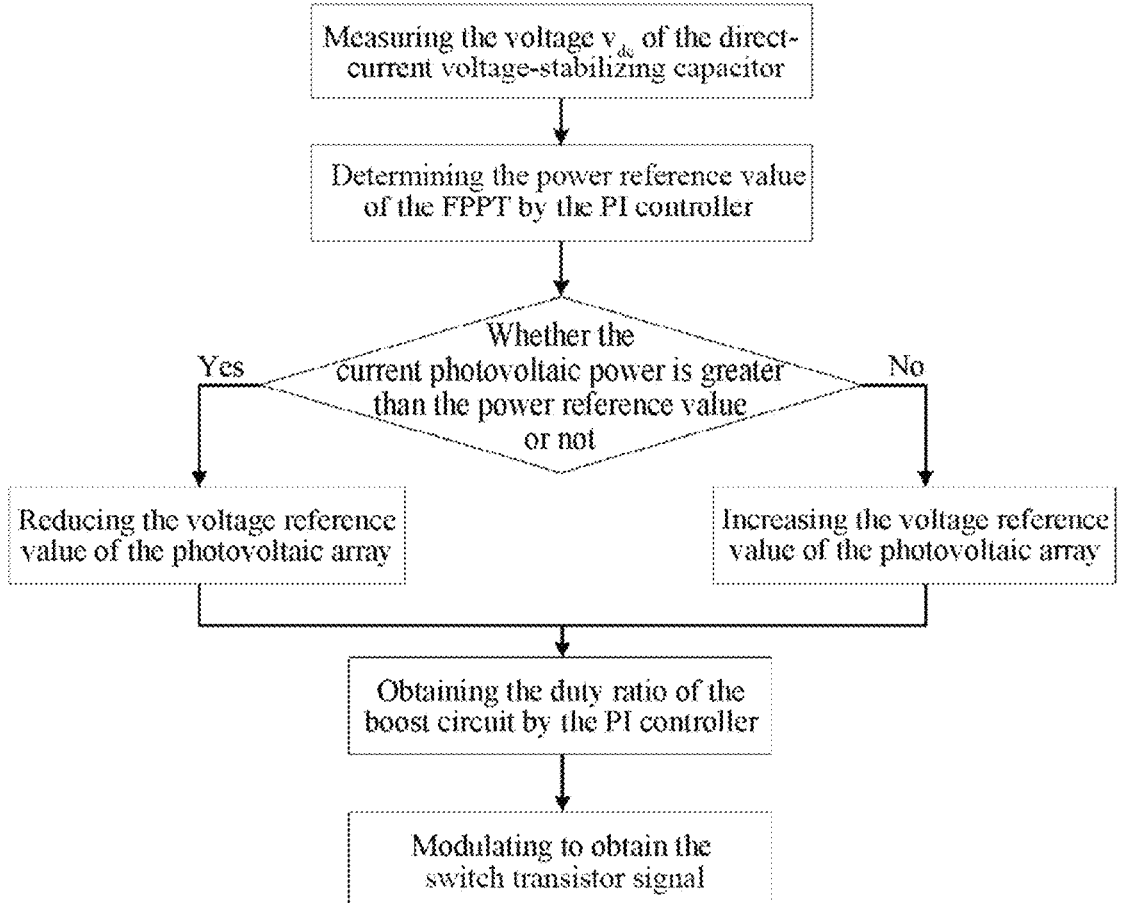

Measuring the voltage $v_{dc}$ of the direct-current voltage-stabilizing capacitor Determining the power reference value of the FPPT by the PI controller Whether the current photovoltaic power is greater than the power reference value or not Yes No Reducing the voltage reference value of the photovoltaic array Increasing the voltage reference value of the photovoltaic array Obtaining the duty ratio of the boost circuit by the PI controller Modulating to obtain the switch transistor signal

FAULT CURRENT-LIMITING CONTROL METHOD AND DEVICE FOR PHOTOVOLTAIC GRID-FORMING SYSTEM

CROSS-REFERENCE TO RELATED APPLICATION

This patent application claims the benefit and priority of Chinese Patent Application No. 202311164800.2 filed with the China National Intellectual Property Administration on Sep. 11, 2023, the disclosure of which is incorporated by reference herein in its entirety as part of the present application.

TECHNICAL FIELD

The present disclosure relates to a photovoltaic grid connection technology, in particular to a fault current-limiting control method and device for a photovoltaic grid-forming system.

BACKGROUND

In order to deal with energy and environmental problems, new energy power generation has been paid more and more attention. As an important form of new energy power generation, the photovoltaics has been continuously improved in terms of the installed capacity. However, with the decrease of synchronous machines and the increase of grid-following converters in the power grid, the overall inertia and stability of the power grid are greatly affected. Therefore, it is necessary to strengthen the stability of the inverter grid-connected system by means of control, so that the inverter has a certain ability to support the power grid. This kind of inverter is usually called a grid-forming inverter.

Because the converter is usually designed according to the requirement of energy transmission, the overcurrent capacity is usually weak. When unexpected faults (such as low-voltage faults in the grid side) occur in the system, these faults may cause a sharp increase in current to damage capacitors, power switches and so on.

Therefore, how to ensure that the converter can support the power grid as much as possible without exceeding the rated output current limit is of great practical significance for alleviating the energy shortage crisis and the large-scale grid connection of photovoltaic power generation systems and improving the operational performance.

At present, there are many fault current-limiting schemes for three-phase and single-phase grid-connected photovoltaic systems, but most of schemes are carried out under the premise of grid-following control. There are few fault current-limiting schemes for grid-forming systems. Moreover, the existing fault current-limiting schemes of the grid-forming system involve a process of switching operation modes, resulting in a poor dynamic performance, and cannot meet the control requirement of the photovoltaic grid-forming system under the fault conditions.

SUMMARY

In order to solve the problems in the prior art, the present disclosure provides a fault current-limiting control method and device for a photovoltaic grid-forming system.

In order to achieve the purpose, the present disclosure provides the following scheme.

Disclosed is a fault current-limiting control method for a photovoltaic grid-forming system, including:

acquiring a voltage of a capacitor on an input side of an inverter in the photovoltaic grid-forming system;

generating a switch transistor control signal based on the voltage of the capacitor on the input side of the inverter;

acquiring a voltage signal and a current signal of a converter at a common-coupling point in the photovoltaic grid-forming system;

obtaining a voltage amplitude of the common-coupling point and a voltage signal and a current signal in a stationary synchronous frame system based on the voltage signal and the current signal of the converter at the common-coupling point;

determining a fault depth based on the voltage amplitude of the common-coupling point, and determining an active power reference of the inverter based on the fault depth;

generating a voltage reference value and a phase reference value of the inverter based on the voltage signal and the current signal in the stationary synchronous frame system and the active power reference of the inverter;

converting the voltage reference value and the phase reference value of the inverter into a current reference value through fixed virtual impedance; and obtaining an inverter modulating wave based on the current reference value, and obtaining a control signal of each switch transistor of the inverter after the inverter modulating wave is modulated by Sinusoidal Pulse Width Modulation (SPWM).

In this embodiment, the step of generating a switch transistor control signal based on the voltage of the capacitor on the input side of the inverter includes:

controlling a working voltage of a photovoltaic array by a flexible power point tracking controller based on the voltage of the capacitor on the input side of the inverter to obtain a difference value between a photovoltaic working voltage reference value and an actual working voltage value; and generating the switch transistor control signal through a Proportional Integral (PI) controller and a modulation process based on the difference value between the photovoltaic working voltage reference value and the actual working voltage value.

In this embodiment, the step of obtaining a voltage amplitude of the common-coupling and a voltage signal and a current signal in a stationary synchronous frame system based on the voltage signal and the current signal of the converter at the common-coupling point includes:

obtaining the voltage amplitude of the common-coupling point by calculating positive and negative sequence voltage based on the voltage signal of the converter at the common-coupling point; and obtaining the voltage signal and the current signal in the stationary synchronous frame system by carrying out Clark transform on the voltage signal of the converter at the common-coupling point and the current signal of the converter at the common-coupling point.

A fault current-limiting control device for a photovoltaic grid-forming system, configured to carry out the fault current-limiting control method for the photovoltaic grid-forming system, includes a flexible power point tracking (FPPT) controller, a fault current-limiting controller, a grid-forming controller, a short-time current-limiting controller and a Pulse Width Modulation (PWM) modulator.

The converter in the photovoltaic grid-forming system is controlled by the FPPT controller. The inverter in the photovoltaic grid-forming system is controlled by the fault current-limiting controller, the grid-forming controller, the short-time current-limiting controller and the PWM modulator which are connected in sequence.

The flexible power point tracking controller is configured to generate a switch transistor control signal based on the voltage of the capacitor on the input side of the inverter.

The fault current-limiting controller is configured to obtain the voltage amplitude of the common-coupling point and the voltage signal and the current signal in the stationary synchronous frame system based on the voltage signal and the current signal of the converter at the common-coupling point, and configured to determine the fault depth based on the voltage amplitude of the common-coupling point and determine the active power reference of the inverter based on the fault depth.

The grid-forming controller is configured to generate the voltage reference value and the phase reference value of the inverter based on the voltage signal and the current signal in the stationary synchronous frame system and the active power reference of the inverter.

The short-time current-limiting controller is configured to convert the voltage reference value and the phase reference value of the inverter into the current reference value through fixed virtual impedance.

The PWM modulator is configured to obtaining the inverter modulating wave based on the current reference value, and obtaining the control signal of each switch transistor of the inverter by modulating the inverter modulating wave.

In this embodiment, the grid-forming controller includes an active power loop and a reactive power loop. The active power loop is configured to obtain a voltage phase reference value through the active power reference and a current frequency different value. The reactive power loop is configured to obtain a voltage amplitude reference value through a current voltage difference value.

In this embodiment, the device also includes a Proportional Resonant (PR) controller.

The PR controller is configured to acquire the current reference value after passing through a current-limiting process and obtain the inverter modulating wave based on the current reference value.

In this embodiment, the control signal of each switch transistor of the inverter is obtained by modulating the inverter modulating wave using SPWM modulation.

According to the embodiments provided by the present disclosure, the present disclosure has the following technical effects.

The converter is controlled by the fault current-limiting controller, the grid-forming controller and the short-time current-limiting controller, which enables the converter to play a role in supporting the voltage or the frequency of the power grid when the power grid fault occurs, while ensures that the output current of the converter is within the range of its maximum allowable current. The photovoltaic system is controlled by the FPPT controller, so that the operation point can be autonomously adjusted according to the energy requirement of a downstream converter so as to match front-stage and rear-stage energy. When a fault occurs, the present disclosure can realize a limitation of output current, while output active power or reactive power as much as possible within the allowable range to support the power grid. Because there is no operation mode switching process, the method and the device have good dynamic performance and high economy, and can meet the control requirement under the fault conditions of the photovoltaic grid-forming system.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

FIG. 2 is a control flow chart of an FPPT controller according to the present disclosure.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments acquired by the ordinary technical staff in the art under the premise of without contributing creative labor belong to the scope protected by the present disclosure.

The present disclosure aims to provide a fault current-limiting control method and device for a photovoltaic grid-forming system, which can realize a limitation of output current, and output active or reactive power as much as possible within the allowable range to support the power grid. Moreover, the method and the device are good in dynamic performance and high in economy, and can meet the control requirement under the fault conditions of the photovoltaic grid-forming system.

To make the foregoing objective, features and advantages of the present disclosure clearer and more comprehensible, the present disclosure is further described in detail below with reference to the attached figures and specific embodiments.

Figure 1:
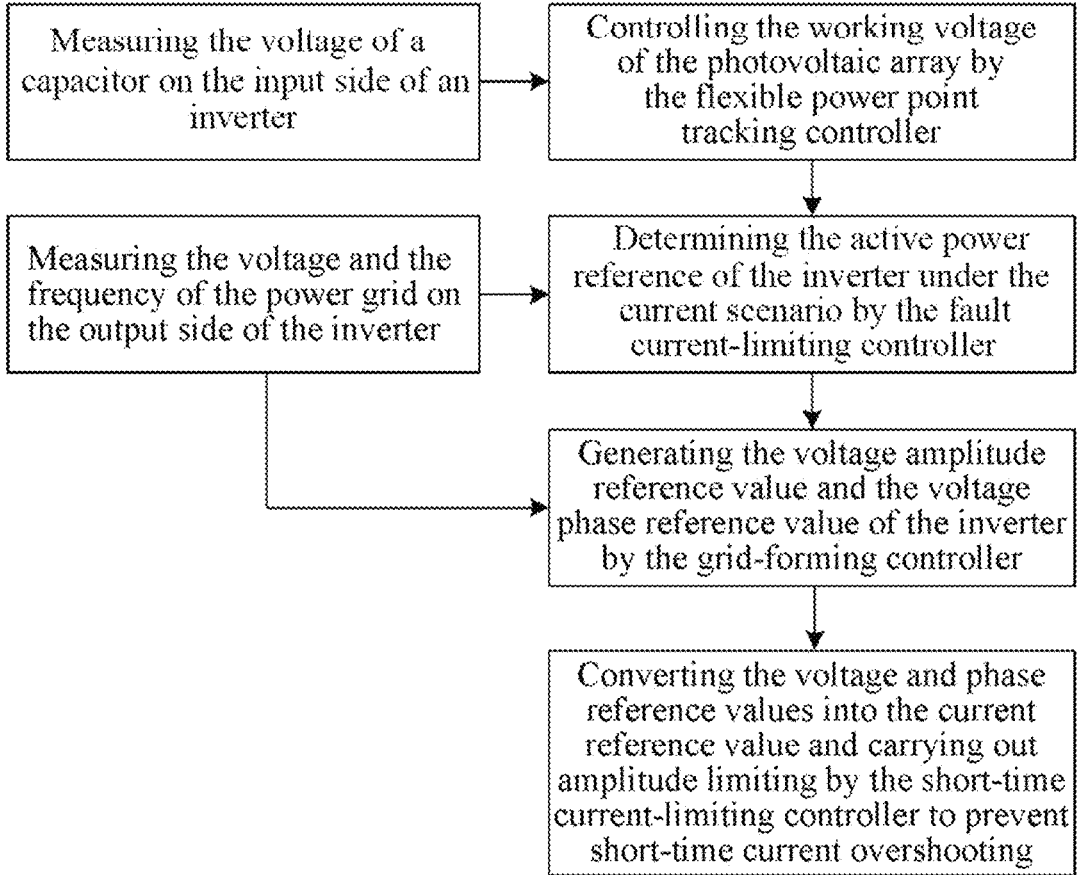
FIG. 1 is an implementation flow chart of a fault current-limiting control method for a photovoltaic grid-forming system according to the present disclosure.

As shown in FIG. 1, the fault current-limiting control method for a photovoltaic grid-forming system according to the present disclosure includes the following steps.

Step one, the voltage $v_{dc}$ of a capacitor on the input side of an inverter is measured. The working voltage $v_{pv}$ of a photovoltaic array is controlled by an FPPT controller. The FPPT controller first maintains the photovoltaic working voltage $v_{pv}$ lower than its maximum power point voltage so as to ensure that the power $P_{pv}$ of the photovoltaic array has a monotonic relationship with $v_{pv}$ and the power $P_{pv}$ of the photovoltaic array increases with the increase of the working voltage $v_{pv}$ of the photovoltaic array. Then, taking expected direct-current bus voltage $v_{pvref}$ as a reference value and actual direct-current bus voltage $v_{dc}$ as a feedback value, the power reference value $P_{pvref}$ of the FPPT controller is output by a PI controller. At this time, there is a monotonous relationship between the power $P_{pv}$ of the photovoltaic array and the working voltage $v_{pv}$ of the photovoltaic array. Therefore, when the actual power of the photovoltaic array (referred to as photovoltaic power for short) is greater than the power reference value $P_{pvref}$ the working voltage $v_{pv}$ of the photovoltaic array is controlled to be decreased (that is, the voltage reference value of the photovoltaic array is decreased), and when the photovoltaic power is less than or equal to the power reference value $P_{pvref}$ the working voltage $v_{pv}$ of the photovoltaic array is controlled to be increased (that is, the voltage reference value of the photovoltaic array is increased), and finally the power $P_{pv}$ of the photovoltaic array can be controlled so that the voltage $v_{dc}$ of the capacitor on the input side of the inverter is stable. The stability of the voltage $v_{dc}$ of the capacitor on the input side of the inverter can show that the active power outputted by grid-connected inverter at this time is equal to the active power generated by the photovoltaic array. The duty ratio of a boost circuit is obtained by the PI controller after the difference between a photovoltaic working voltage reference value given by a flexible power point tracking controller and actual working voltage is calculated, and a switch transistor signal is obtained through modulation in a modulation process to control the converter. The control flow of the FPPT controller is as shown in FIG. 2.

Step two, the voltage signal $v_{cABC}$ and the current signal $i_{cABC}$ of a converter at a common-coupling point are measured through a voltage sensor and a current sensor, respectively. The voltage amplitude $V_{pu}$ of the common-coupling point is acquired by calculating positive and negative sequence voltage based on the voltage signal $v_{cABC}$, and the voltage signal and the current signal in a stationary synchronous frame system are obtained by carrying out the Clark transform on the voltage signal $v_{cABC}$ and the current signal $i_{cABC}$, so as to calculated the current output power $P_{inv}$ of the inverter.

Step three, an active output reference value is controlled by a fault current-limiting controller according to a fault depth. Where the fault depth is determined by the voltage amplitude $V_{pu}$ of the common-coupling point obtained in step two.

Figure 3:
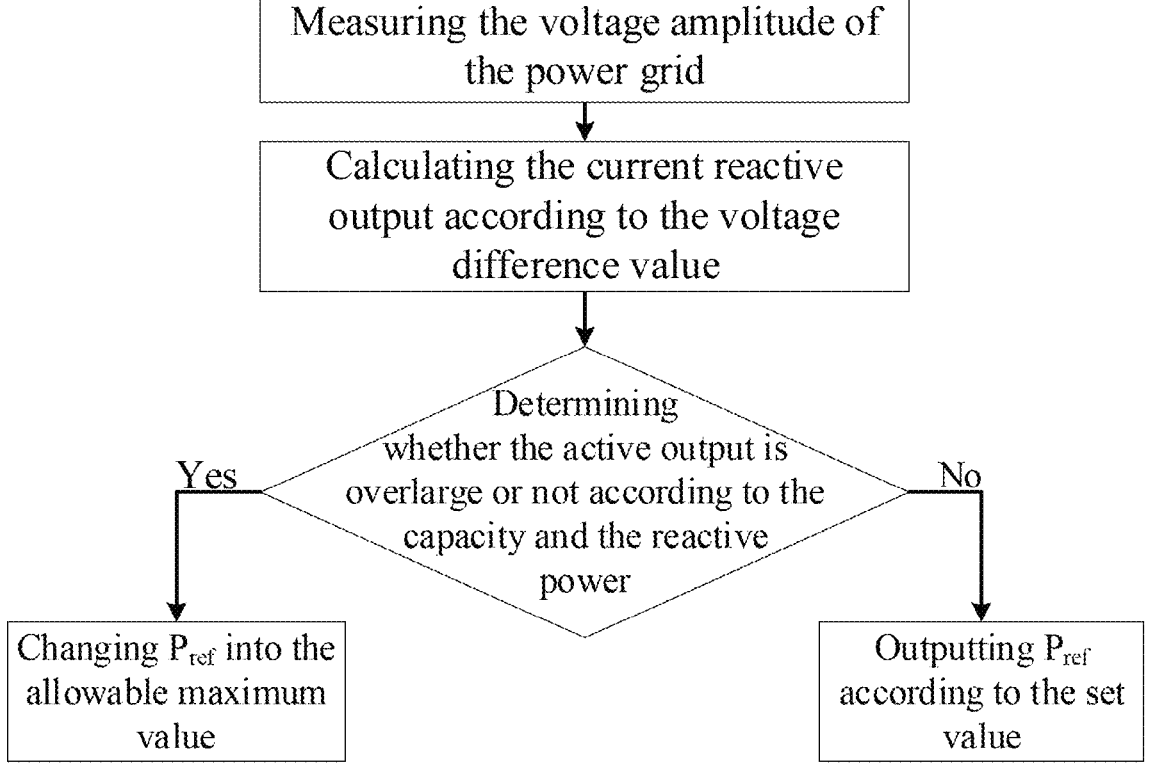
FIG. 3 is a control flow chart of a fault current-limiting controller according to the present disclosure.

The inverter needs to provide additional output or absorb reactive power to support the power grid when the voltage fails, which results in an increase in the output current of the inverter, even to a degree of possibly exceeding the maximum capacity limitation of the inverter. Therefore, it is necessary to reduce the active output accordingly after the fault depth is determined, so that the output current of the inverter keeps within the current limiting range. The fault current-limiting controller can determine the active power reference $P_{ref}$ of the inverter under the current scenario, and transmit the active power reference $P_{ref}$ to a subsequent virtual synchronous generator controller. Due to a greater priority to the reactive output, the active power reference $P_{ref}$ is a smaller value between an original active predetermined value and the maximum active value that can be output by the converter after giving priority to reactive output. Based on this, the control flow of the fault current-limiting controller is as shown in FIG. 3.

Step four, the voltage reference value and the phase reference value of the inverter are generated through a grid-forming controller.

Figure 4:
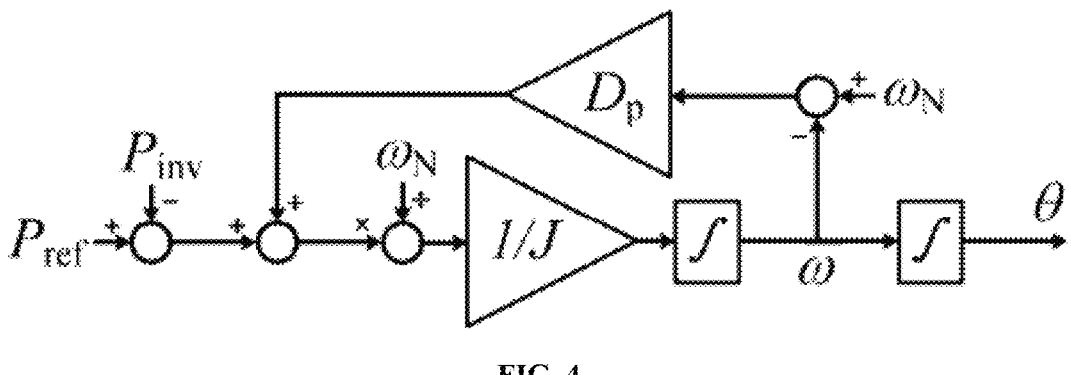
FIG. 4 is a control block diagram of an active power loop in a grid-forming controller according to the present disclosure.
Figure 5:
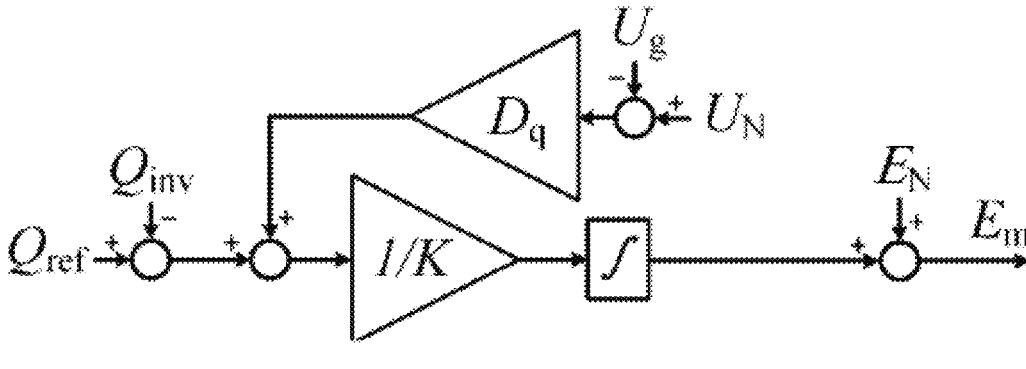
FIG. 5 is a control block diagram of a reactive power loop in a grid-forming controller according to the present disclosure.

The grid-forming controller is mainly divided into two parts such as an active power loop and a reactive power loop. The active power loop obtains the voltage phase reference value through the active power reference $P_{ref}$ and a difference of an actual frequency and a rated frequency. The specific control structure is as shown in FIG. 4. The reactive power loop obtains a voltage amplitude reference value through the current voltage difference value, and the specific control structure is as shown in FIG. 5. In FIG. 4 and FIG. 5, $P_{ref}$, $P_{inv}$ and $D_p$ are active power reference, active power output and damping coefficient, respectively; and J, $\omega$, $\omega_N$ and $\theta$ are moment of inertia, angular frequency, angular frequency set value and the voltage phase reference value of a modulation signal, respectively. $Q_{ref}$, $Q_{inv}$ and $D_q$ are the reactive power reference, reactive power output and Q-V loop coefficients, respectively; and $U_g$, $U_N$, K, $E_N$ and $E_m$ are the voltage amplitude of the common-coupling point, a set value of the grid voltage amplitude, an integral coefficient of the modulation signal, a set value of output voltage and a reference value of voltage amplitude, respectively.

Specifically, the active ring obtains difference between the current output angular frequency $\omega$ and the angular frequency set value $\omega_N$, which is fed back to the difference value between the active power reference $P_{ref}$ and the actual power $P_{inv}$ after beige subjected to the gain of the damping coefficient $D_p$, then is divided by the angular frequency set value and further by the set moment of inertia J, subsequently passes through an integrator to obtain the angular frequency $\omega$, and finally passes through an integrator to obtain a current phase $\theta$.

The reactive ring obtains difference between the voltage amplitude $U_g$ of the common-coupling point and the set value $U_N$ of the grid voltage amplitude, which is fed back to the difference value between the reactive power reference value $Q_{ref}$ and the actual reactive power $Q_{inv}$ after being subjected to the gain of the Q-V loop coefficient $D_q$, then is divided by the integral coefficient K, subsequently passes through an integrator to obtain the difference value between the output voltage set value $E_N$ and the output voltage reference value $E_m$, and finally passes through the feedforward of the output voltage set value $E_N$ to obtain the output voltage reference value $E_m$.

Figure 6:
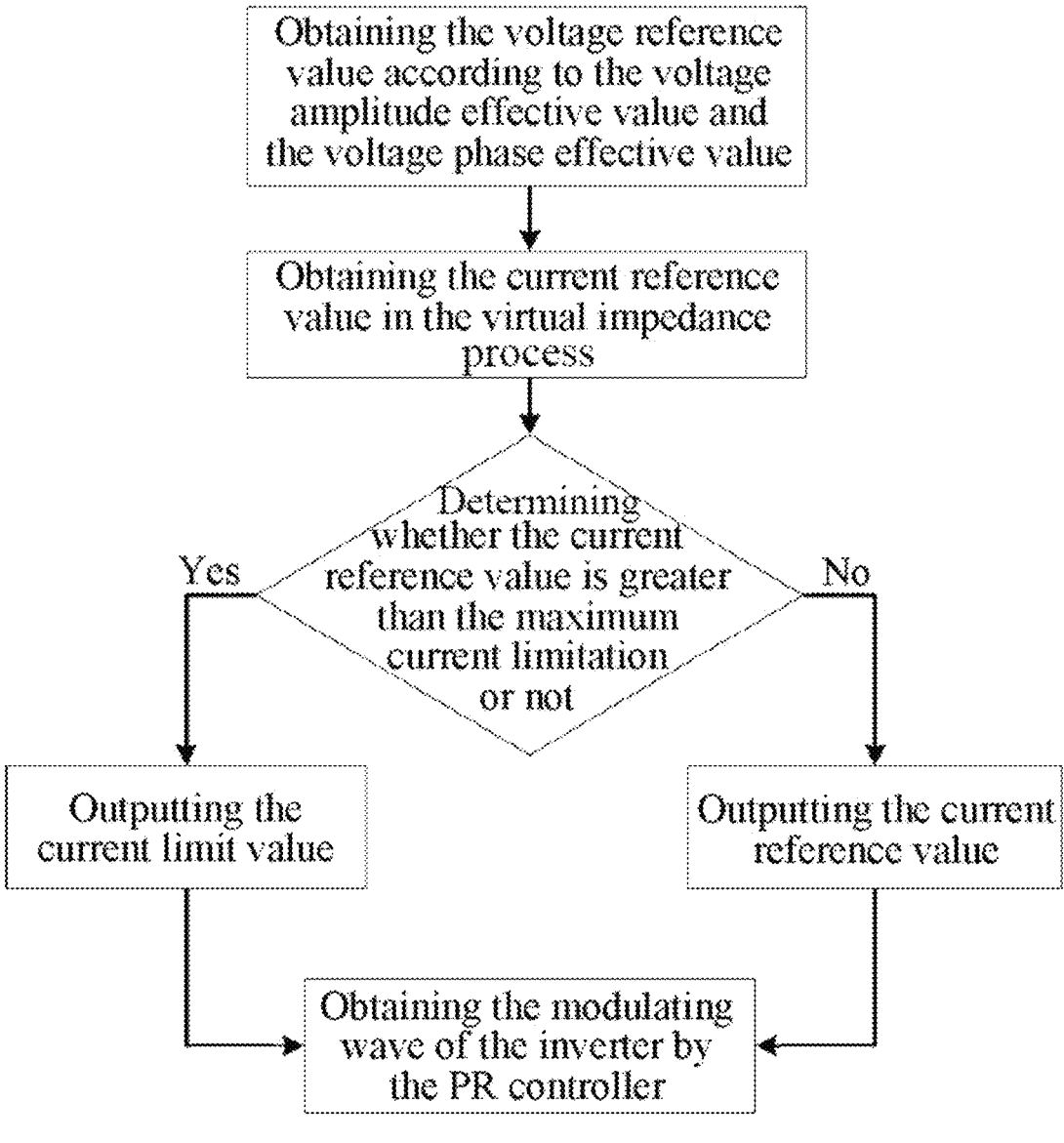
FIG. 6 is a flow chart of a short-time current-limiting controller according to the present disclosure.

Step five, the voltage reference value and the voltage phase reference value obtained by the grid-forming controller are converted into a current reference value through fixed virtual impedance by a short-time current-limiting controller, and the current reference value is transmitted to the PR controller after a current-limiting process, to obtain an inverter modulating wave, and the control signal of each switch transistor of the inverter is obtained after SPWM modulation on the inverter modulating wave. The specific control structure is as shown in FIG. 6.

Figure 7:
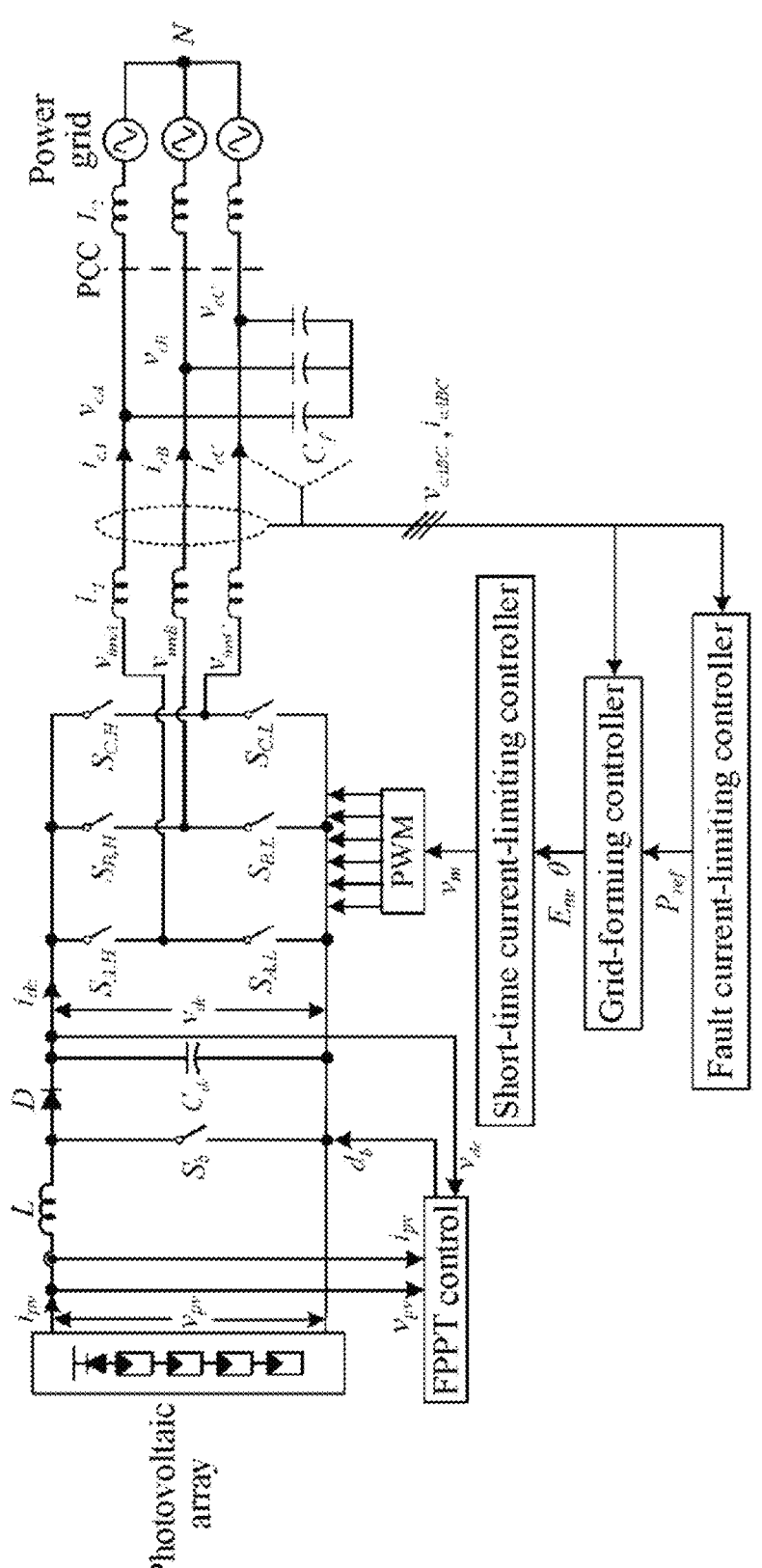
FIG. 7 is a structural schematic diagram of a fault current-limiting control device for a photovoltaic grid-forming system according to the present disclosure.
Figure 8:
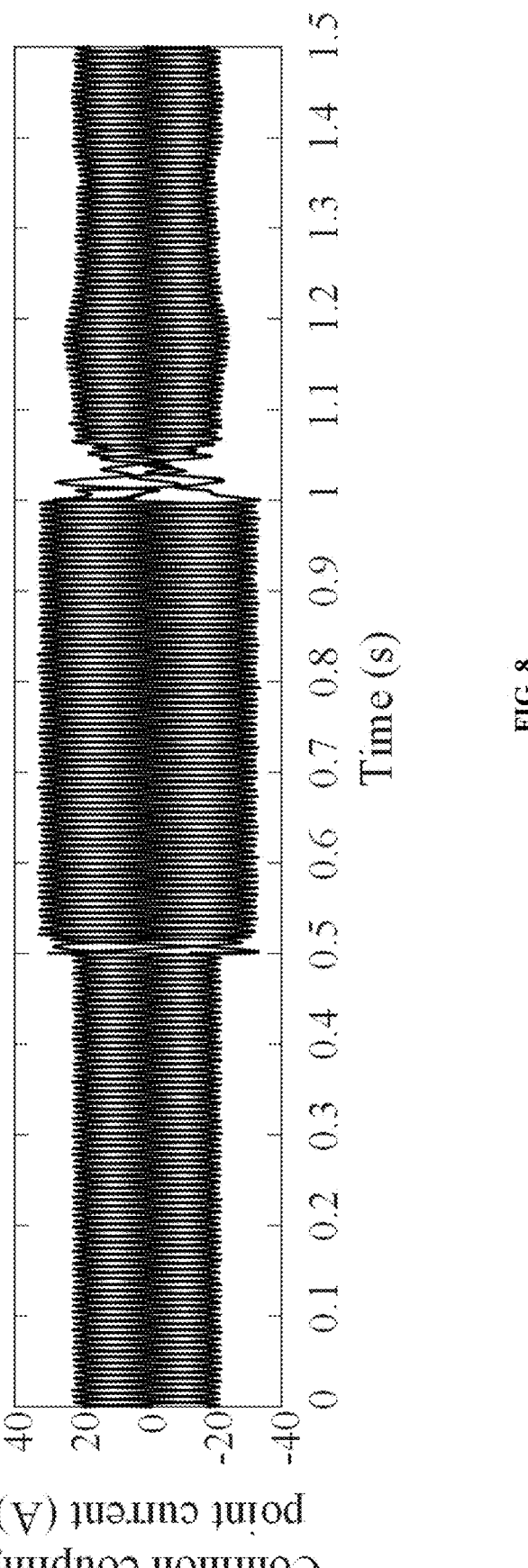
FIG. 8 is a diagram showing a current change of the common-coupling point under the fault condition of grid voltage according to the present disclosure.
Figure 9:
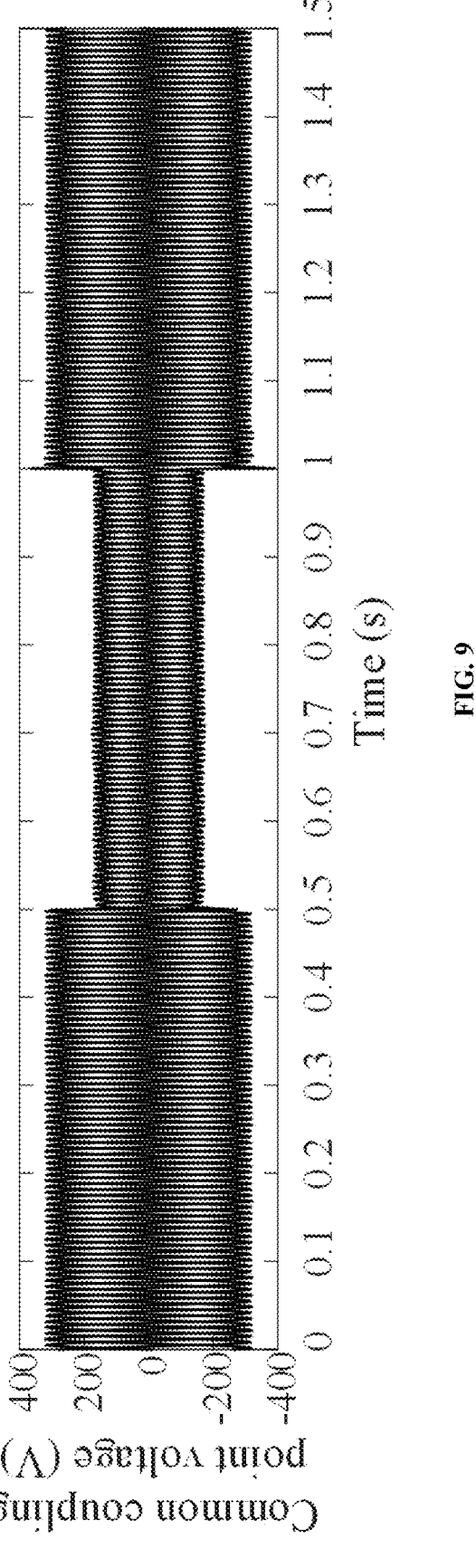
FIG. 9 is a diagram showing a voltage change of the common-coupling point under the fault condition of grid voltage according to the present disclosure.
Figure 10:
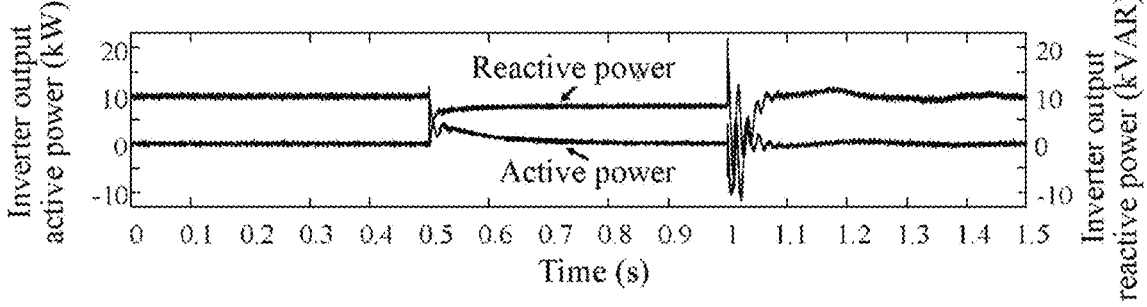
FIG. 10 is a diagram showing a change of an active power output by an inverter under the fault condition of grid voltage according to the present disclosure.
Figure 11:
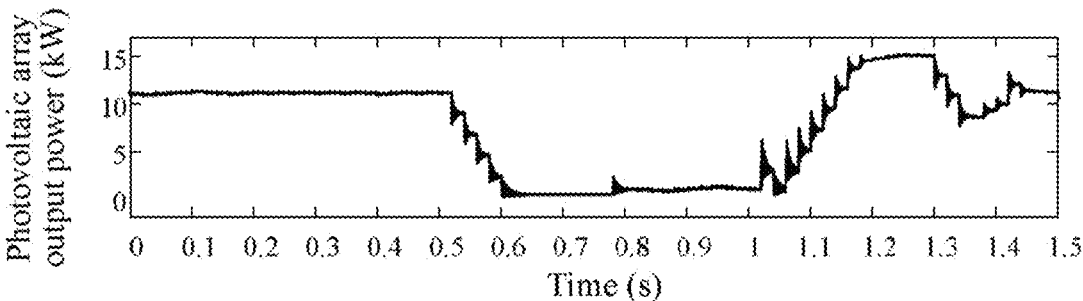
FIG. 11 is a diagram showing a change of power output by a photovoltaic array under the fault condition of grid voltage according to the present disclosure.

In order to implement the above-mentioned fault current-limiting control method for a photovoltaic grid-forming system, the fault current-limiting control device for a photovoltaic grid-forming system is set by taking a three-phase two-stage grid-connected photovoltaic system with an LCL filter as an example, and the three-phase and two-stage grid-connected photovoltaic system is mainly composed of a photovoltaic array, a boost converter, a three-phase two-level inverter and an output filter. The structure of the device is as shown in FIG. 7, where $v_{pv}$ and $i_{pv}$ represent the voltage and the current of the photovoltaic array, respectively; $d_b$ and $v_{dc}$ represent the duty ratio and the output voltage of the boost converter, respectively; and $v_{invA}$, $v_{invB}$ and $v_{invC}$ represent the bridge arm midpoint voltages of phase a, phase b and phase c of the three-phase two-level inverter, respectively; and $v_{cA}$, $v_{cB}$ and $v_{cC}$ as well as $i_{cA}$, $i_{cB}$ and $i_{cC}$ represent the voltage and the inverter output current of phase a, phase b and phase c at the common-coupling point, respectively. Pref represents the active power set value in the grid-forming controller, $E_m$ and θ represent the amplitude reference value and the phase reference value of the converter output voltage, respectively; and $v_m$ represents the modulating wave of the three-phase two-level inverter. The converter is controlled by the FPPT controller, and the three-phase two-level inverter is controlled by the fault current-limiting controller, the grid-forming controller, the short-time current-limiting controller and PWM modulator.

Based on this device structure, the fault current-limiting control of the grid-connected photovoltaic system is carried out, and the change of parameters of the three-phase two-stage grid-connected photovoltaic system with an LCL filter under the condition of grid voltage fault are shown in FIG. 8 to FIG. 11.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In summary, the contents of this specification should not be understood as the limitation of the present disclosure.

What is claimed is:

1. A fault current-limiting control method for a photovoltaic grid-forming system, comprising:

acquiring a voltage of a capacitor on an input side of an inverter in the photovoltaic grid-forming system;

generating a switch transistor control signal based on the voltage of the capacitor on the input side of the inverter;

acquiring a voltage signal and a current signal of a converter at a common-coupling point in the photovoltaic grid-forming system;

obtaining a voltage amplitude of the common-coupling point and a voltage signal and a current signal in a stationary synchronous frame system based on the voltage signal and the current signal of the converter at the common-coupling point;

determining a fault depth based on the voltage amplitude of the common-coupling point, and determining an active power reference of the inverter based on the fault depth;

generating a voltage reference value and a phase reference value of the inverter based on the voltage signal and the current signal in the stationary synchronous frame system and the active power reference of the inverter;

converting the voltage reference value and the phase reference value of the inverter into a current reference value through fixed virtual impedance; and obtaining an inverter modulating wave based on the current reference value, and obtaining a control signal of each switch transistor of the inverter after the inverter modulating wave is modulated by Sinusoidal Pulse Width Modulation (SPWM).

2. The method according to claim 1, wherein the generating a switch transistor control signal based on the voltage of the capacitor on the input side of the inverter comprises:

controlling a working voltage of a photovoltaic array by a flexible power point tracking controller based on the voltage of the capacitor on the input side of the inverter to obtain a difference value between a photovoltaic working voltage reference value and an actual working voltage value; and generating the switch transistor control signal through a Proportional Integral (PI) controller and a modulation process based on the difference value between the photovoltaic working voltage reference value and the actual working voltage value.

3. The method according to claim 1, wherein the obtaining a voltage amplitude of the common-coupling point and a voltage signal and a current signal in a stationary synchronous frame system based on the voltage signal and the current signal of the converter at the common-coupling point comprises:

obtaining the voltage amplitude of the common-coupling point by calculating positive and negative sequence voltage based on the voltage signal of the converter at the common-coupling point; and obtaining the voltage signal and the current signal in the stationary synchronous frame system by carrying out Clark transform on the voltage signal of the converter at the common-coupling point and the current signal of the converter at the common-coupling point, respectively.

4. A fault current-limiting control device for a photovoltaic grid-forming system, configured to carry out the fault current-limiting control method for a photovoltaic grid-forming system according to claim 1, and comprising a flexible power point tracking (FPPT) controller, a fault current-limiting controller, a grid-forming controller, a short-time current-limiting controller and a Pulse Width Modulation (PWM) modulator;

wherein the converter in the photovoltaic grid-forming system is controlled by the FPPT controller; the inverter in the photovoltaic grid-forming system is controlled by the fault current-limiting controller, the grid-forming controller, the short-time current-limiting controller and the PWM modulator which are connected in sequence;

the flexible power point tracking controller is configured to generate the switch transistor control signal based on the voltage of the capacitor on the input side of the inverter;

the fault current-limiting controller is configured to obtain the voltage amplitude of the common-coupling point and the voltage signal and the current signal in the stationary synchronous frame system based on the voltage signal and the current signal of the converter at the common-coupling point, and is configured to determine the fault depth based on the voltage amplitude of the common-coupling point and determine the active power reference of the inverter based on the fault depth;

the grid-forming controller is configured to generate the voltage reference value and the phase reference value of the inverter based on the voltage signal and the current signal in the stationary synchronous frame system and the active power reference of the inverter;

the short-time current-limiting controller is configured to convert the voltage reference value and the phase reference value of the inverter into the current reference value through fixed virtual impedance; and the PWM modulator is configured to obtain the inverter modulating wave based on the current reference value, and obtain the control signal of each switch transistor of the inverter by modulating the inverter modulating wave.

5. The device according to claim 4, wherein the grid-forming controller comprises an active power loop and a reactive power loop; the active power loop is configured to obtain a voltage phase reference value through the active power reference and a current frequency different value; and the reactive power loop is configured to obtain a voltage amplitude reference value through a current voltage difference value.

6. The device according to claim 4, comprising a Proportional Resonant (PR) controller, wherein the PR controller is configured to acquire the current reference value after passing through a current-limiting process and obtain the inverter modulating wave based on the current reference value.

7. The device according to claim 4, wherein the control signal of each switch transistor of the inverter is obtained by modulating the inverter modulating wave using SPWM modulation.

8. The device according to claim 4, wherein the generating a switch transistor control signal based on the voltage of the capacitor on the input side of the inverter comprises:

controlling a working voltage of a photovoltaic array by a flexible power point tracking controller based on the voltage of the capacitor on the input side of the inverter to obtain a difference value between a photovoltaic working voltage reference value and an actual working voltage value; and generating the switch transistor control signal through a Proportional Integral (PI) controller and a modulation process based on the difference value between the photovoltaic working voltage reference value and the actual working voltage value.

9. The device according to claim 4, wherein the obtaining a voltage amplitude of the common-coupling point and a voltage signal and a current signal in a stationary synchronous frame system based on the voltage signal and the current signal of the converter at the common-coupling point comprises:

obtaining the voltage amplitude of the common-coupling point by calculating positive and negative sequence voltage based on the voltage signal of the converter at the common-coupling point; and obtaining the voltage signal and the current signal in the stationary synchronous frame system by carrying out Clark transform on the voltage signal of the converter at the common-coupling point and the current signal of the converter at the common-coupling point, respectively.

* * * * *